(12) United States Patent
Kim et al.

(10) Patent No.: US 10,604,151 B2
(45) Date of Patent: Mar. 31, 2020

(54) APPARATUS FOR CONTROLLING STEERING ANGLE, LANE KEEPING ASSIST SYSTEM HAVING THE SAME AND METHOD THEREOF

(71) Applicants: Hyundai Motor Company, Seoul (KR); Kia Motors Corporation, Seoul (KR)

(72) Inventors: Hoi Won Kim, Gwacheon-si (KR); Dae Young Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 284 days.

(21) Appl. No.: 15/724,106

(22) Filed: Oct. 3, 2017

(65) Prior Publication Data

US 2019/0009779 A1  Jan. 10, 2019

(30) Foreign Application Priority Data

Jul. 4, 2017  (KR) ........................ 10-2017-0084922

(51) Int. Cl.
*B60W 30/12* (2020.01)
*B62D 15/02* (2006.01)
(Continued)

(52) U.S. Cl.
CPC ............. *B60W 30/12* (2013.01); *B62D 1/286* (2013.01); *B62D 6/007* (2013.01); *B62D 6/10* (2013.01);
(Continued)

(58) Field of Classification Search
CPC .......... B62D 1/286; B62D 6/10; B62D 6/007; B62D 15/025; B60W 30/12;
(Continued)

(56) References Cited

U.S. PATENT DOCUMENTS 6,085,860 A * 7/2000 Hackl ................... B60T 8/1764
180/197
6,226,579 B1 * 5/2001 Hackl ................... B60T 8/1755
180/422

(Continued)

FOREIGN PATENT DOCUMENTS

| EP | 1607306 B1 | 8/2007 |
|---|---|---|
| JP | 2017035982 A | 2/2017 |
| KR | 20130112358 A | 10/2013 |

*Primary Examiner* — Mussa A Shaawat
(74) *Attorney, Agent, or Firm* — Morgan, Lewis & Bockius LLP

(57) ABSTRACT

An apparatus for controlling a steering angle, a system including the same, and a method thereof are provided may include a steering angle gain variation determination device that determines an increase or a decrease of a steering angle gain variation rate depending on a steering angle error value, a steering angle gain determination device that determines a steering angle gain based on the steering angle gain variation rate, a steering angle gain regulation device that determines a final gain by reflecting a driver intention in a steering angle gain, and a steering torque determination device that determines steering torque by use of the final gain.

20 Claims, 9 Drawing Sheets

(51) Int. Cl.
- *B62D 6/10* (2006.01)
- *B62D 1/28* (2006.01)
- *B62D 6/00* (2006.01)

(52) U.S. Cl.
CPC ...... *B62D 15/025* (2013.01); *B60T 2201/086* (2013.01); *B60T 2201/087* (2013.01); *B60W 2510/202* (2013.01); *B60W 2540/18* (2013.01)

(58) Field of Classification Search
CPC ......... B60W 2540/18; B60W 2510/202; B60T 2201/086; B60T 2201/087
See application file for complete search history.

(56) References Cited

U.S. PATENT DOCUMENTS

| | | | | |
|---|---|---|---|---|
| 6,250,419 B1 * | 6/2001 | Chabaan | ............... | B62D 5/0463 180/443 |
| 6,293,366 B1 * | 9/2001 | Chabaan | ............... | B62D 5/0463 180/443 |
| 6,425,454 B1 * | 7/2002 | Chabaan | ............... | B62D 5/0463 180/443 |
| 6,712,175 B2 * | 3/2004 | Kind | ............... | B62D 5/005 180/402 |
| 6,802,226 B2 * | 10/2004 | Ono | ............... | G01N 19/02 73/862.325 |
| 6,895,318 B1 * | 5/2005 | Barton | ............... | B60T 8/1755 180/204 |
| 8,078,361 B2 | 12/2011 | Galkowski et al. | | |
| 2003/0078712 A1 * | 4/2003 | Shimakage | ............ | B62D 1/286 701/41 |
| 2006/0217860 A1 * | 9/2006 | Ihara | ............ | B62D 15/025 701/41 |
| 2008/0040002 A1 * | 2/2008 | Galkoswki | ............ | B62D 6/003 701/43 |
| 2008/0091318 A1 * | 4/2008 | Deng | ............ | B62D 6/003 701/41 |
| 2010/0145575 A1 * | 6/2010 | Switkes | ............ | B62D 15/025 701/41 |
| 2013/0060413 A1 * | 3/2013 | Lee | ............ | B62D 1/286 701/23 |
| 2016/0236712 A1 * | 8/2016 | Shirakata | ............ | G08B 21/06 |
| 2017/0008557 A1 * | 1/2017 | Mitsumoto | ............ | B62D 1/286 |
| 2017/0036692 A1 * | 2/2017 | Kojo | ............ | B62D 5/008 |
| 2017/0036694 A1 * | 2/2017 | Okuda | ............ | B62D 6/02 |
| 2017/0144705 A1 * | 5/2017 | Lee | ............ | B62D 15/021 |
| 2017/0313304 A1 * | 11/2017 | Shiraishi | ............ | B60W 10/18 |
| 2018/0154929 A1 * | 6/2018 | Nejo | ............ | B62D 5/0463 |
| 2018/0170377 A1 * | 6/2018 | Tatsukawa | ............ | B60W 30/12 |
| 2018/0281849 A1 * | 10/2018 | Irie | ............ | B62D 6/007 |
| 2018/0345978 A1 * | 12/2018 | Fujii | ............ | B60W 30/18163 |

* cited by examiner

APPARATUS FOR CONTROLLING STEERING ANGLE, LANE KEEPING ASSIST SYSTEM HAVING THE SAME AND METHOD THEREOF

CROSS-REFERENCE TO RELATED APPLICATION

The present application claims priority to Korean Patent Application No. 10-2017-0084922, filed on Jul. 4, 2017, the entire contents of which is incorporated herein for all purposes by this reference.

BACKGROUND OF THE INVENTION

Field of the Invention

The present invention relates to an apparatus for controlling a steering angle, a lane keeping assist system having the same, and a method thereof, and more particularly, to a technology capable of minimizing the sense of difference felt by a driver for a steering angle while controlling a robust steering angle in vehicle variance and disturbance.

Description of Related Art

In general, a lane keeping assist system is a system which automatically controls a steering system such that a vehicle travels along the center portion of a lane. The lane keeping assist system detects the location of the vehicle inside the lane by using a sensor for recognizing a lane, calculates a steering angle required to locate the vehicle to the center portion of the lane, calculates steering torque to keep the required steering angle, and controls the steering of the vehicle with the calculated steering torque.

However, when a lateral gradient of a road is changed or the variance occurs in a steering system, the difference is made between rotational torque and recovery torque in the steering system, and the steering wheel angle is formed in a direction of increasing rotational torque, thereby causing a vehicle to be slanted.

In particular, the lane keeping assist system assists a driver to keep the lane. However, when the steering wheel is controlled to keep the lane, the driver may feel the sense of difference. Accordingly, currently, the lane keeping assist system controls the steering wheel such that the sense of difference felt by the driver is minimized. Therefore, as the lane keeping assist system is set to slightly control the steering, the lane keeping assist system may be readily affected by vehicle variance and disturbance. In particular, when the lateral gradient of the road is changed or the variance occurs in the steering system, the vehicle may be slantly controlled.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus for controlling a steering angle, configured for varying a proportional gain for a steering angle control depending on situations to apply a smaller gain when a steering angle error value represents a smaller value, minimizing the sense of difference felt by a driver in steering, and to apply a larger gain when a tracking error is increased in vehicle variance and disturbance, allowing a robust control, a lane keeping assist system having the same, and a method thereof.

Various aspects of the present invention provide an apparatus for controlling a steering angle, configured for reducing a gain increase rate and restricting a gain recovery rate according to driver torque to enhance the stability of a system, a lane keeping assist system having the same, and a method thereof.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus for controlling a steering angle may include a steering angle gain variation determination device that determines an increase or a decrease of a steering angle gain variation rate depending on a steering angle error value, a steering angle gain determination device that determines a steering angle gain based on the steering angle gain variation rate, a steering angle gain regulation device that determines a final gain in which a driver intention is reflected in a steering angle gain, and a steering torque determination device that determines steering torque by use of the final gain.

According to various aspects of the present invention, the steering angle gain variation determination device may include a variation rate determination device that determines the steering angle error value and compares the steering angle error value with a predetermined threshold value to determine whether to increase or decrease the steering angle gain variation rate, and a maximum gain selection device that selects a maximum gain when determination is made to increase the steering angle gain variation rate.

According to various aspects of the present invention, the steering angle gain variation determination device may further include an increase variation rate determination device that determines an increase variation rate by use of an initial gain, the maximum gain, and a time taken from the initial gain to the maximum gain, and a decrease variation rate determination device that determines a decrease variation rate by use of the initial gain, the maximum gain, and a time taken from the maximum gain to the initial gain.

According to various aspects of the present invention, the steering angle gain variation determination device may further include a variation rate setting device that determines whether the steering torque arrives at a maximum value and to set the steering angle gain variation rate to zero when the steering torque arrives at the maximum value.

According to various aspects of the present invention, the variation rate determination device may determine the steering angle error value, may determine to increase the steering angle gain variation rate when the steering angle error value is equal to or more than the predetermined threshold value, and may determine to decrease the steering angle gain variation rate when the steering angle error value is less than the predetermined threshold value.

According to various aspects of the present invention, the variation rate determination device may determine the steering angle error value by determining a difference between an actual steering angle and a required steering angle.

According to various aspects of the present invention, the steering angle gain regulation device may include a first gain regulation ratio determination device that regulates downward the steering angle gain to determine a first gain regulation ratio, when a driver involves, and a second gain regulation ratio determination device that restricts the first gain regulation ratio from being recovered and determines a second gain regulation ratio, after the driver involves.

According to various aspects of the present invention, the steering angle gain regulation device may further include a driver intention reflection device that determines a steering angle gain, in which the driver intention is reflected, by applying the second gain regulation ratio to the steering angle gain.

According to various aspects of the present invention, the steering angle gain regulation device may further include a final gain determination device that determines the final gain by adding up the steering angle gain, in which the driver intention is reflected, and an initial gain.

According to various aspects of the present invention, the steering angle gain regulation device may further include a driver-intention-reflected steering angle gain restriction device that sets a maximum value and a minimum value of the steering angle gain in which the driver intention is reflected.

According to various aspects of the present invention, the steering torque determination device may determine the steering torque by use of the final gain, the steering angle error value, a steering control differential gain, and a steering control integral gain.

According to various aspects of the present invention, a lane keeping assist system may include a steering angle detector that detects a steering angle of a vehicle to output an actual steering angle, a lane keeping location control device that determines and outputs a required steering angle for lane keeping by the vehicle, a torque detector that detects and outputs a torque value of the vehicle, and a steering angle control apparatus that regulates a steering angle gain depending on a steering angle error value which is the difference between the actual steering angle and the required steering angle.

According to various aspects of the present invention, the steering angle control apparatus may decrease the steering angle gain when the steering angle error value is less than a predetermined threshold value, and may increase the steering angle gain when the steering angle error value is equal to or more than the predetermined threshold value.

According to various aspects of the present invention, the steering angle control apparatus may include a steering angle gain variation determination device that determines an increase or a decrease of a steering angle gain variation rate depending on the steering angle error value, a steering angle gain determination device that determines a steering angle gain based on the steering angle gain variation rate, a steering angle gain regulation device that determines a final gain in which a driver intention is reflected in the steering angle gain, and a steering torque determination device that determines steering torque by use of the final gain.

According to various aspects of the present invention, a method of controlling a steering angle may include determining an increase or a decrease of a steering angle gain variation rate depending on a steering angle error value, determining a steering angle gain based on the steering angle gain variation rate, determining a final gain in which a driver intention is reflected in the steering angle gain, and determining steering torque by use of the final gain.

According to various aspects of the present invention, the determining of the increase or the decrease of the steering angle gain variation rate may include determining the steering angle error value and comparing the steering angle error value with a predetermined threshold value to determine whether to increase or decrease the steering angle gain variation rate, selecting a maximum gain when determination is made to increase the steering angle gain variation rate, determining an increase variation rate by use of an initial gain, the maximum gain, and a time taken from the initial gain to the maximum gain, and determining a decrease variation rate by use of the initial gain, the maximum gain, and a time taken from the maximum gain to the initial gain.

According to various aspects of the present invention, the determining of the increase or the decrease of the steering angle gain variation rate may further include determining whether the steering torque arrives at a maximum value, and setting the steering angle gain variation rate to zero when the steering torque arrives at the maximum value.

According to various aspects of the present invention, the determining of the increase or the decrease of the steering angle gain variation rate may further include determining the steering angle error value, determining to increase the steering angle gain variation rate when the steering angle error value is equal to or more than the predetermined threshold value, and determining to decrease the steering angle gain variation rate when the steering angle error value is less than the predetermined threshold value.

According to various aspects of the present invention, the determining of the final gain may include regulating downward the steering angle gain to determine a first gain regulation ratio, when a driver involves, restricting the first gain regulation ratio from being recovered to determine a second gain regulation ratio, after the driver involves, determining a steering angle gain, in which the driver intention is reflected, by applying the second gain regulation ratio to the steering angle gain, and determining the final gain by adding up the steering angle gain, in which the driver intention is reflected, and the initial gain.

According to various aspects of the present invention, the determining of the steering torque may include determining the steering torque by use of the final gain, the steering angle error value, a steering control differential gain, and a steering control integral gain.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
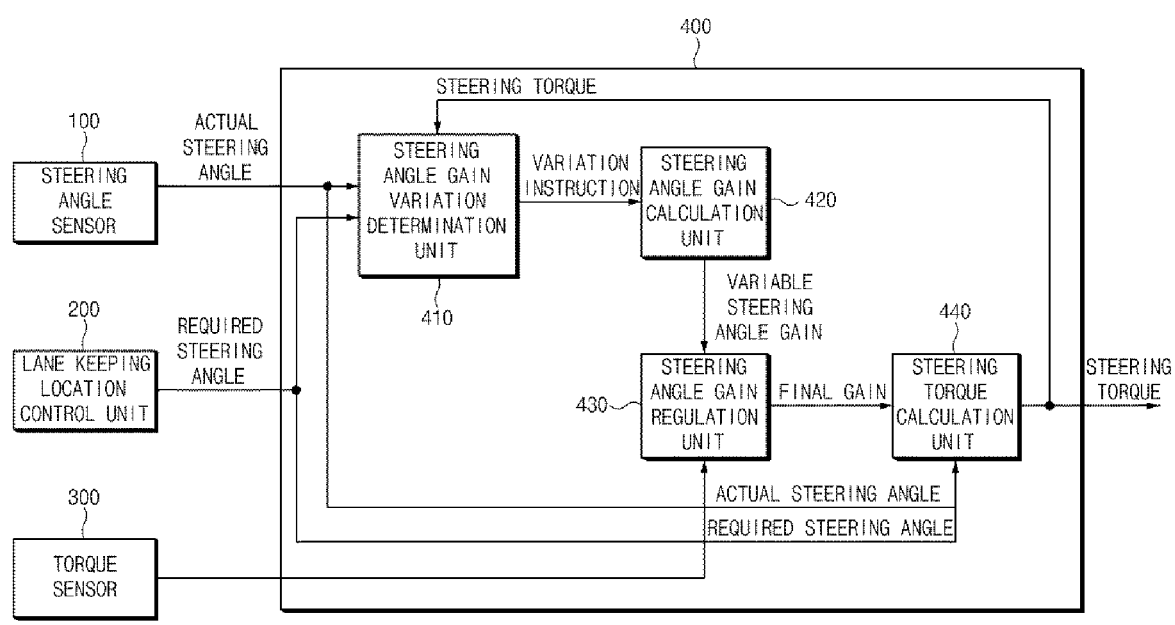
FIG. 1 is a block diagram illustrating the configuration of a lane keeping assist system including an apparatus for controlling a steering angle, according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the accompanying drawings In the drawings, the same reference numerals will be used throughout to designate the same or equivalent elements In addition, in the following description, a detailed description of well-known features or functions will be ruled out in order not to unnecessarily obscure the gist of the present invention.

In the following description of elements according to an exemplary embodiment of the present invention, the terms 'first', 'second', 'A', 'B', '(a)', and '(b)' may be used The terms are used only to distinguish relevant elements from other elements, and the nature, the order, or the sequence of the relevant elements is not limited to the terms In addition, unless otherwise defined, all terms used herein, including technical or scientific terms, have the same meanings as those generally understood by those skilled in the art to which the present invention pertains Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 9.

Figure 2:
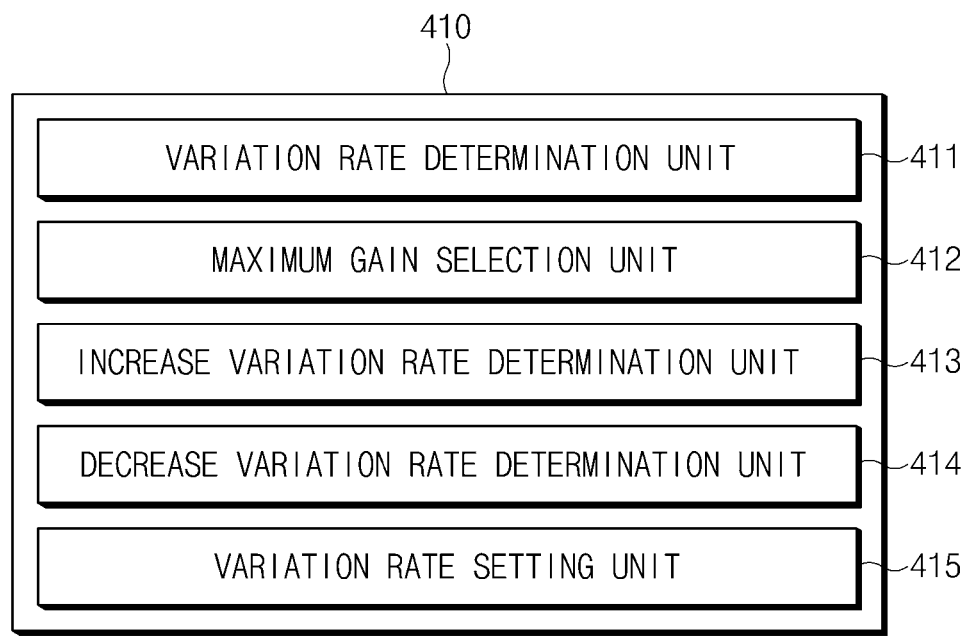
FIG. 2 is a block diagram illustrating the detailed configuration of a steering angle gain variation determination device of FIG. 1.
Figure 3:
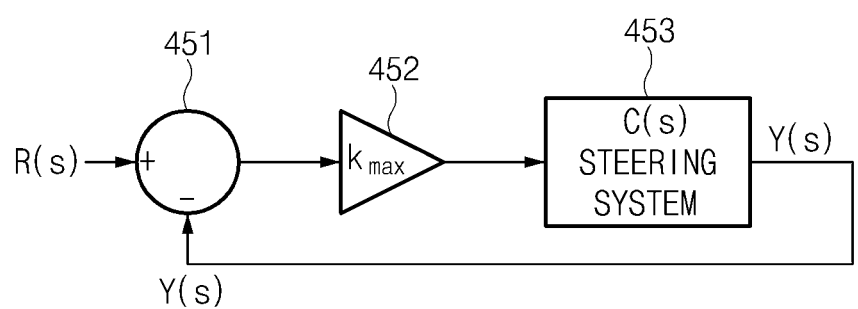
FIG. 3 is a view illustrating a method of selecting the maximum gain from the maximum gain selection device of FIG. 2.
Figure 4:
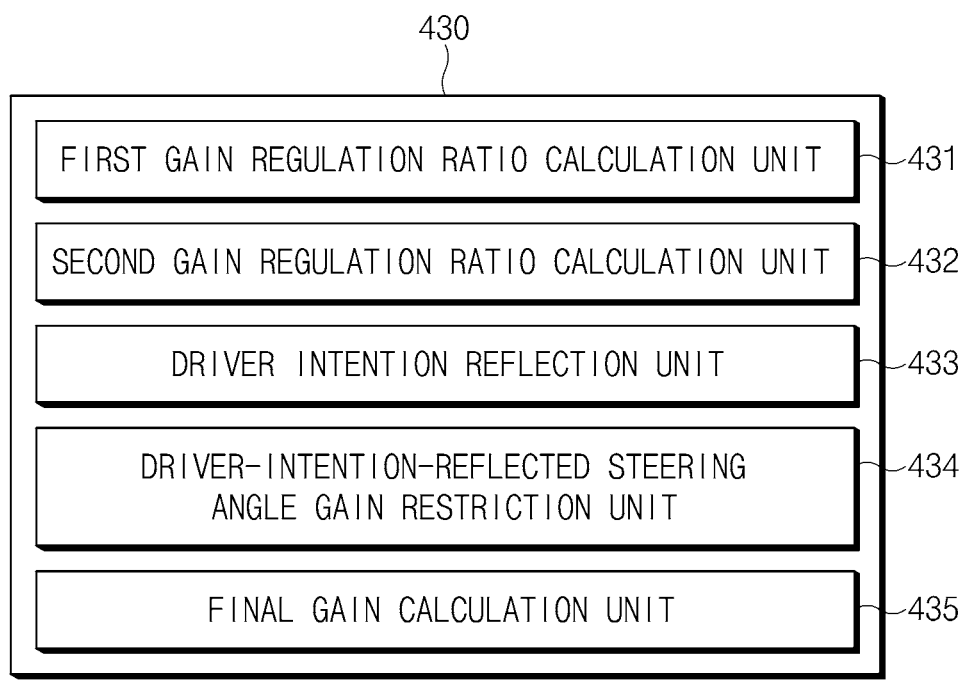
FIG. 4 is a block diagram illustrating the detailed configuration of a steering angle gain regulation device, according to an exemplary embodiment of the present invention.

FIG. 1 is a block diagram illustrating the configuration of a lane keeping assist system, according to an exemplary embodiment of the present invention, FIG. 2 is a block diagram illustrating the detailed configuration of a steering angle gain variation determination device of FIG. 1, FIG. 3 is a view illustrating a method of selecting the maximum gain from a maximum gain selection device 412 of FIG. 2, and FIG. 4 is a block diagram illustrating the detailed configuration of a steering angle gain regulation device, according to an exemplary embodiment of the present invention.

Referring to FIG. 1, according to an embodiment of the present invention, the lane keeping assist system includes a steering angle detector 100, a lane keeping location control device 200, a torque detector 300, and an apparatus 400 for controlling a steering angle (hereinafter, referred to as "steering angle control apparatus").

The steering angle detector 100 detects a present steering angle of a vehicle to output an actual steering angle to the steering angle control apparatus 400.

The lane keeping location control device 200 determines a required steering angle for a lane keeping control of the vehicle and outputs the required steering angle to the steering angle control apparatus 400.

The torque detector 300 detects a present torque value of the vehicle and outputs the present torque value to the steering angle control apparatus 400.

The steering angle control apparatus 400 varies a steering angle gain depending on situations. Accordingly, when a steering angle error value represents a smaller value, the steering angle control apparatus 400 applies a smaller gain to minimize the sense of difference felt by a driver in steering. When the steering angle error value is increased in vehicle variance and disturbance, the steering angle control apparatus 400 applies a larger gain to perform a robust control. In the instant case, the steering error value, which is the difference between the required steering angle and the actual steering angle, is referred to as a tracking error value. In addition, the steering angle control apparatus 400 determines and applies a steering angle gain, in which a driver intention is reflected, by use of driver torque to increase the satisfaction of a driver when the steering angle is controlled.

To this end, the steering angle control apparatus 400 includes a steering angle gain variation determination device 410, a steering angle gain determination device 420, a steering angle gain regulation device 430, and a steering torque determination device 440. The steering angle gain variation determination device 410 determines the variation of the steering angle gain depending on the steering angle error value (tracking error value) to determine the increase or the decrease of the steering angle gain variation rate. In the instant case, An initial value of the steering angle gain is fixedly applied. According to an exemplary embodiment of the present invention, the steering angle gain is varied in the range of the initial value ($k_{ini}$) and the maximum value ($k_{max}$) depending on the steering angle error value. As described above, regarding the direction of varying the steering angle gain, the direction of increasing the steering angle gain from the initial value ($k_{ini}$) to the maximum value ($k_{max}$) is referred to as an increase direction, and the direction of decreasing the steering angle gain from the maximum value ($k_{max}$) to the initial value ($k_{ini}$) is referred to as a decrease direction thereof. When the steering angle gain is varied in the increase direction, an increase rate of the steering angle gain is referred to an increase variation rate.

When the steering angle gain is varied in the decrease direction, a decrease rate of the steering angle gain is referred to as a decrease variation rate.

In addition, the steering angle gain determination device 420 selects the maximum value of the steering angle gain and determines the increase variation rate and the decrease variation rate by use of the maximum value and the initial value.

The steering angle gain determination device 420 may determine a steering angle gain based on a steering angle gain variation rate.

The steering angle gain regulation device 430 determines a final gain obtained by reflecting the driver intention in the steering angle gain.

The steering torque determination device 440 determines steering torque by use of the final gain.

Referring to FIG. 2, the steering angle gain variation determination device 410 determines whether to vary the steering angle gain by use of a steering angle error value of the actual steering angle relative to the required steering angle. In other words, the steering angle gain variation determination device 410 determines whether to increase or decrease the steering angle gain variation rate depending on the steering angle error value.

To this end, the steering angle gain variation determination device 410 includes a variation rate determination device 411, a maximum gain selection device 412, an increase variation rate determination device 413, a decrease variation rate determination device 414, and a variation rate setting device 415.

The variation rate determination device 411 determines the steering angle error value and compares the steering angle error value with a predetermined threshold value to determine whether to increase or decrease the steering angle gain variation rate. In detail, when the steering angle error value is equal to or more than the predetermined threshold value, the variation rate determination device 411 sets the steering angle gain variation rate to the increase rate. When the steering angle error rate is less than the predetermined threshold value, the variation rate determination device 411 sets the steering angle gain variation rate to the decrease rate.

$$\text{if } (|\alpha_{req} - \alpha_{act}| > \alpha_{thld}) \quad \text{Equation 1}$$
$$\gamma = \gamma_+$$
$$\text{else}$$
$$\gamma = \gamma_-$$

In Equation 1, $\alpha_{req}$ denotes the required steering angle, $\alpha_{act}$ is the actual steering angle, and $\alpha_{thld}$ denotes the predetermined threshold value.

In the case of infinitely increasing the steering angle gain, a steering system 453 may be instable. Accordingly, the maximum gain selection device 412 selects the maximum gain ($k_{max}$) for stably maintaining the steering system 453 to determine the increase variation rate $\gamma+$ and the decrease variation on rate $\gamma-$. In FIG. 3, a determination device 451 determines the difference between a target steering angle R(s) and a present steering angle Y(s), a determination device 452 determines steering torque by multiplying a steering angle error by the steering angle gain, and a steering system 453 receives the steering torque and rotates, changing the steering angle.

In the instant case, the maximum gain ($k_{max}$) is selected as expressed in following Equation 2.

$$\frac{Y(s)}{R(s)} = \frac{k_{max}C(s)}{1 + k_{max}C(s)}, s = \sigma + jw \quad \text{Equation 2}$$

In the instant case, Y(s) denotes the present steering angle, R(s) denotes the target steering angle, and C(s) denotes a Laplace transform value. The maximum gain selection device 412 selects the maximum gain ($k_{max}$) such that all Ss satisfying $k_{max}C(s)=-1$ in Equation 2 are present on a left-half section of a complex plane.

$$\gamma_+ = \frac{k_{max} - k_{ini}}{t_{inc}} \quad \text{Equation 3}$$

The increase variation rate determination device 413 determines, as expressed in Equation 3, the increase variation rate ($\gamma+$) by dividing the difference between the maximum gain ($k_{max}$) and the initial gain ($k_{ini}$) by time ($t_{inc}$) taken from the initial gain ($k_{ini}$) to the determined maximum gain ($k_{max}$). In the instant case, the time ($t_{inc}$) may be determined in production.

$$\gamma_- = \frac{k_{max} - k_{ini}}{t_{dec}} \quad \text{Equation 4}$$

The decrease variation rate determination device 414 determines, as expressed in Equation 4, the decrease variation rate ($\gamma-$) by dividing the difference between the maximum gain ($k_{max}$) and the initial gain ($k_{ini}$) by time ($t_{dec}$) taken from the maximum gain ($k_{max}$) to the initial gain ($k_{ini}$). In the instant case, the time ($t_{dec}$) may be determined in production.

$$\text{if } (|\tau_{sys}| \geq \tau_{max}) \quad \text{Equation 5}$$
$$\gamma = 0$$
$$\text{else}$$
$$\gamma = \gamma$$

The variation rate setting device 415 sets the increase variation rate or the decrease variation rate determined by the increase variation rate determination device 413 or the decrease variation rate determination device 414, respectively. However, to prevent the gain from being unnecessarily increased in the case that the steering torque arrives at the maximum value and thus a steering angle tracking error occurs, the steering angle gain variation rate may be set '0' as expressed in Equation 5. In this case, $\tau_{sys}$ denotes actual steering torque and $T_{max}$ denotes maximum steering torque.

$$k_a(t) = k_a(t-1) + \gamma \quad \text{Equation 6}$$

In the instant case, $k_a(t)$ denotes a variable steering angle gain at a present sampling time, $k_a(t-1)$ denotes a variable steering angle gain at a previous sampling time, and $\gamma$ denotes the variation rate of the steering angle gain. The steering angle gain determination device 420 determines the steering angle gain by use of an increase variation rate or a decrease variation rate as expressed in Equation 6. Referring to FIG. 4, the steering angle gain regulation device 430 determines the final gain by reflecting the driver intention in the steering angle gain determined by the steering angle gain determination device 420. To this end, the steering angle gain regulation device 430 includes a first gain regulation ratio determination device 431, a second gain regulation ratio determination device 432, a driver intention reflection device 433, a driver-intention-reflected steering angle gain restriction device 434, and a final gain determination device 435.

The first gain regulation ratio determination device 431 regulates downward the steering angle gain to prevent the steering angle gain from unnecessarily being increased when the driver involves as expressed in Equation 7.

$$L = \text{Function1}(T_{drv}) \qquad \text{Equation 7}$$

Figure 5:
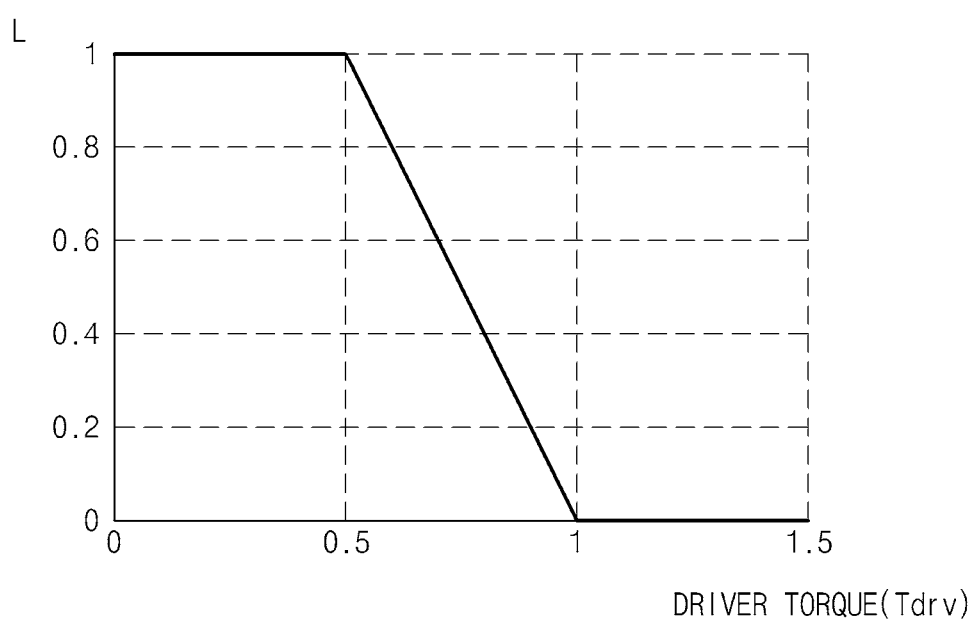
FIG. 5 is a graph illustrating an example of regulating a steering angle gain variation rate as a driver is involved, according to an exemplary embodiment of the present invention.

In the instant case, L and $T_{drv}$ denote a first gain regulation ratio and driver torque, respectively. FIG. 5 is a graph illustrating an example of regulating a variation rate as a driver involves, according to an embodiment of the present invention, wherein a horizontal axis represents the driver torque and a vertical axis represents a value of 'L'. Referring to FIG. 5, when the driver torque is less than 0.5, the value of 'L' is maintained at the value of '1'. Thereafter, when the driver torque becomes 0.5 or more, the value of 'L' is decreased. When the driver torque exceeds 1, the value of 'L' becomes '0'.

The second gain regulation ratio determination device 432 restricts, as expressed in Equation 8, the value of 'L' from being recovered to prevent the steering angle gain from being unnecessarily increased for a specific time after the driver involves in steering.

$$F = \text{Function2}(L) \qquad \text{Equation 8}$$

In the instant case, F denotes a second gain regulation ratio.

In the instant case, for restricting the value of 'L' from being recovered, logic is expressed as Equation 9.

$$\begin{aligned}&\text{if } ((F(t) - F(t-1)) > f_{thld}) \\ &\quad F(t) = F(t-1) + f_{thld} \\ &\text{else} \\ &\quad F(t) = F\end{aligned} \qquad \text{Equation 9}$$

The driver intention reflection device 433 reflects the driver intention in the variable steering angle gain as expressed in Equation 10. The driver intention may be reflected by applying the driver torque ($T_{drv}$).

$$k_{ad} = k_a \times F \qquad \text{Equation 10}$$

In Equation 10, $K_{ad}$ denotes a variable steering angle gain in which the driver intention is reflected, and $K_a$ denotes the variable steering angle gain.

The driver-intention-reflected steering angle gain restriction device 434 restricts the steering angle gain by setting the maximum value and the minimum value of the steering angle gain as expressed in FIG. 11.

$$k_{ad} = \min(k_{ad}, k_{max})$$

$$k_{ad} = \max(k_{ad}, k_{min}) \qquad \text{Equation 11}$$

The final gain determination device 435 determines the final gain by adding up the steering angle gain, in which the driver intention is reflected, and an initial gain as expressed in Equation 12.

$$k_{tot} = k_{ini} + k_{ad} \qquad \text{Equation 12}$$

In other words, the final gain determination device 435 determines a final gain ($k_{tot}$) by adding an existing value of an initial gain ($k_{ini}$) to the variable steering angle gain ($k_{ad}$) in the driver intention is reflected.

The steering torque determination device 440 determines steering torque for the final gain as expressed in Equation 13.

$$T_{req} = k_{tot} \times (\alpha_{req} - \alpha_{act}) + \\ k_{der} \times \frac{d(\alpha_{req} - \alpha_{act})}{dt} + k_{intg} \times \int (\alpha_{req} - \alpha_{act}) \qquad \text{Equation 13}$$

In the instant case, '$k_{tot}$' denotes a steering control proportional gain (final gain), '$k_{der}$' denotes a steering control differential gain, and '$k_{intg}$' denotes a steering control integral gain. The steering torque determination device 440 determines the steering torque by use of the final gain, the steering angle error value, the steering control differential gain, and the steering control integral gain.

As described above, according to an exemplary embodiment of the present invention, the steering angle gain is variably controlled. Accordingly, the steering feeling of the driver is maintained while a robust control is possible against the vehicle variance and disturbance.

Figure 6:
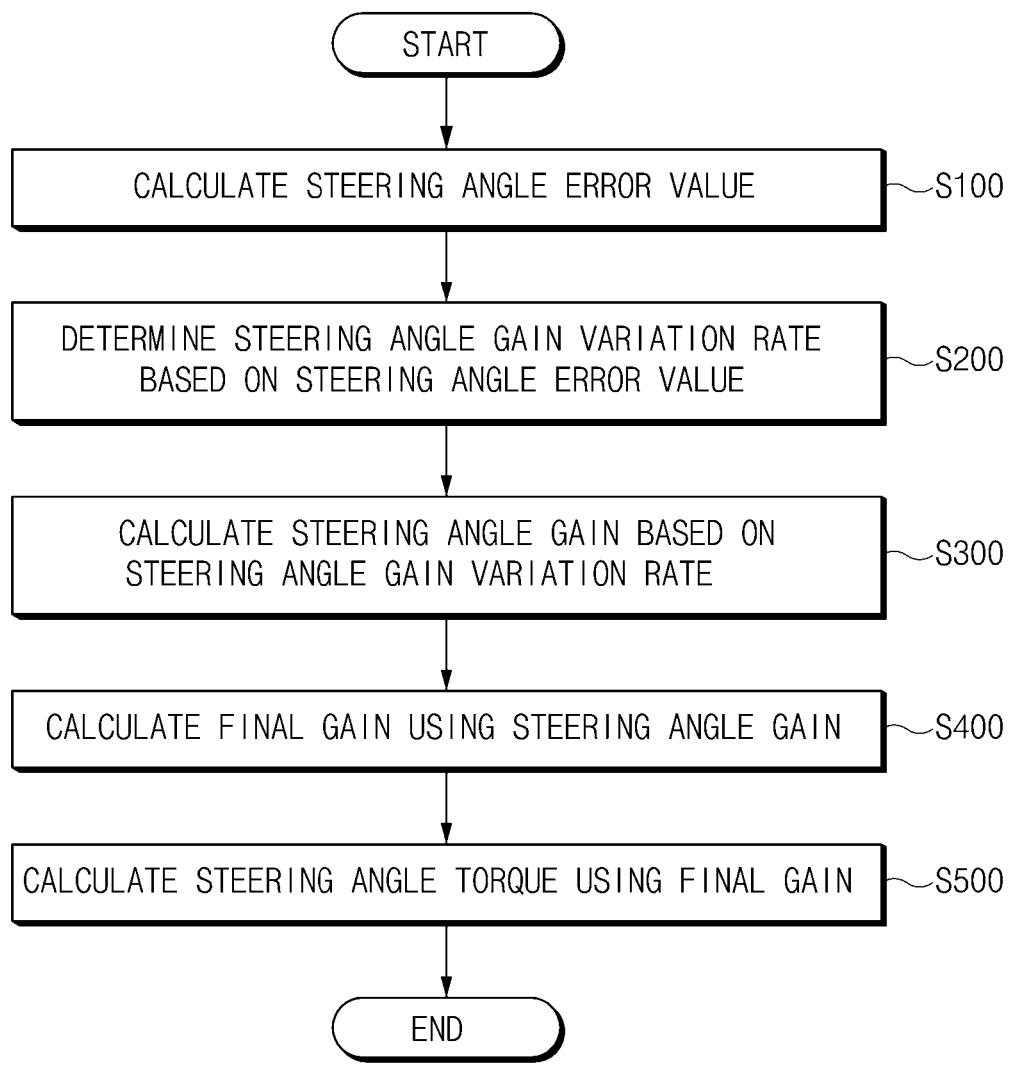
FIG. 6 is a flowchart illustrating a method of controlling a steering angle, according to an exemplary embodiment of the present invention.

Hereinafter, a method of controlling the steering angle according to an exemplary embodiment of the present invention will be described with reference to FIG. 6.

The steering angle control apparatus 400 determines the steering angle error value which is the difference between the actual steering angle and the required steering angle (S100).

Thereafter, the steering angle control apparatus 400 determines the steering angle gain variation rate based on the steering angle error value between the actual steering angle and the required steering angle (S200). The steering angle control apparatus 400 determines the steering angle gain based on the steering angle gain variation rate (S300).

The steering angle control apparatus 400 determines the final gain by regulating the steering angle gain using the first and second regulation ratios (S400). The steering angle control apparatus 400 determines steering torque by use of the final gain (S500).

Figure 7:
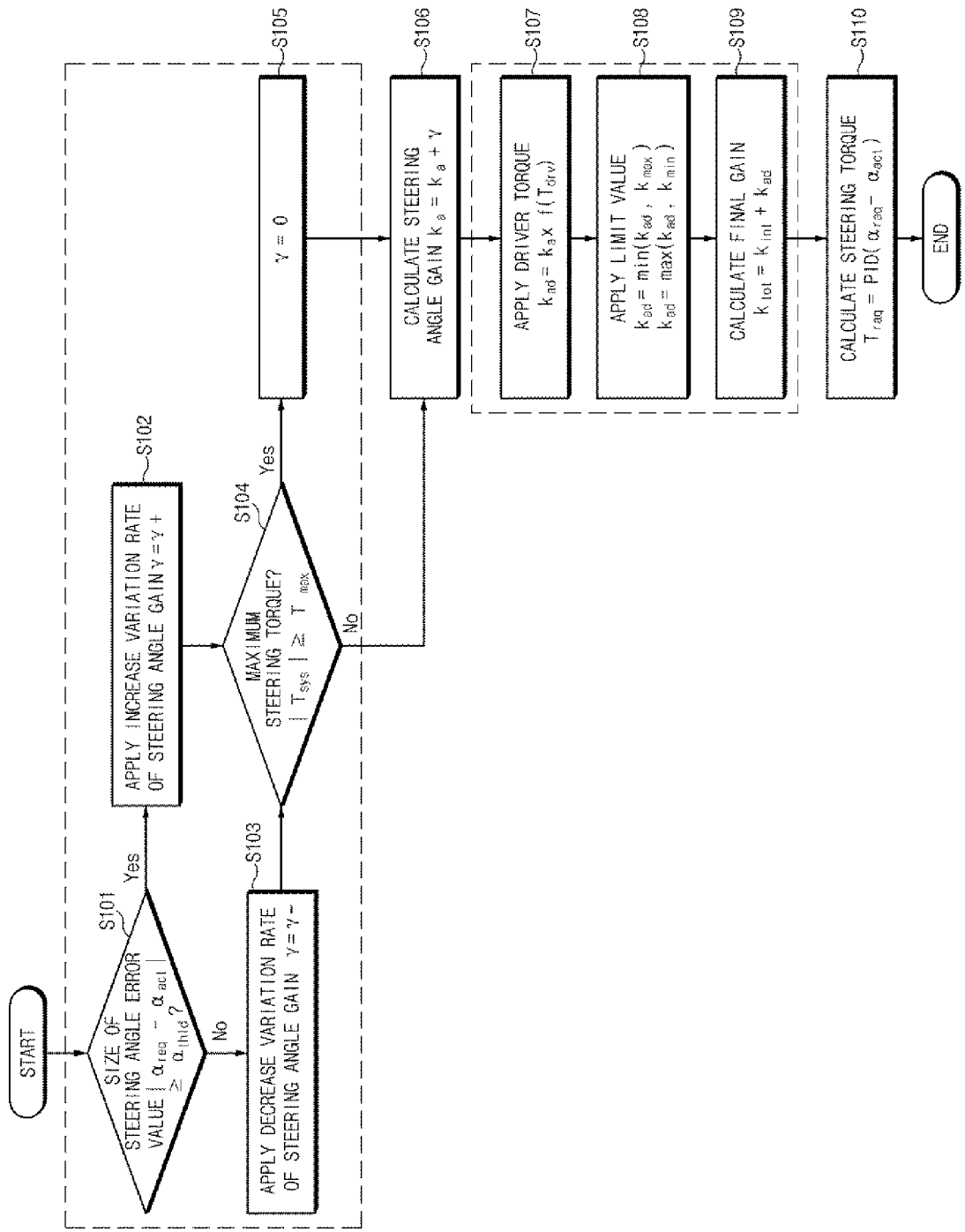
FIG. 7 is a detailed flowchart illustrating a method of controlling a steering angle, according to an exemplary embodiment of the present invention.

Hereinafter, a method of controlling the steering angle according to an exemplary embodiment of the present invention will be described in detail with reference to FIG. 7.

The steering angle control apparatus 400 determines the steering angle error value and determines whether the size of the steering angle error is equal to or more than a predetermined threshold value (S101). When the size of the steering angle error is more than the predetermined threshold value, the increase rate is applied to the steering angle gain variation rate (S102). When the size of the steering angle error is less than or equal to the predetermined threshold value, the decrease variation rate is applied to the steering angle gain variation rate (S103).

Thereafter, the steering angle control apparatus 400 determines whether the steering torque of the vehicle is equal to or more than the maximum torque (S104). When the steering torque arrives at the maximum value, the steering angle gain variation rate is set to zero (S105).

As such, the steering angle control apparatus 400 determines the steering angle gain by use of the steering angle gain variation rate. When the steering torque of the vehicle fails to arrive at the maximum value in operation S104, the steering angle control apparatus 400 maintains the variation rate while determining the steering angle gain (S106).

Subsequently, the steering angle control apparatus 400 determines the steering angle gain, in which the driver intention is reflected, by applying the driver torque to the determined steering angle gain (S107).

In the instant case, the steering angle control apparatus 400 sets the maximum value and the minimum value of the steering angle gain, in which the driver intention is reflected, (S108) and determines the final gain (S109). In other words, the steering angle control apparatus 400 determines a first gain regulation ratio by regulating downward the steering angle gain when the driver involves. After the driver has involved, the steering angle control apparatus 400 restricts the first gain regulation ratio from being recovered and determines a second gain regulation ratio. The steering angle control apparatus 400 determines the steering angle gain, in which the driver intention is reflected, by applying the second gain regulation ratio to the steering angle gain and determines the final gain by adding up the steering angle gain, in which the driver intention is reflected, and the initial gain.

Thereafter, the steering angle control apparatus 400 determines the steering torque by use of the final gain. In the instant case, the steering torque may be determined by use of the final gain, the steering angle error value, the steering control differential gain, and the steering control integral gain (S110).

Figure 8:
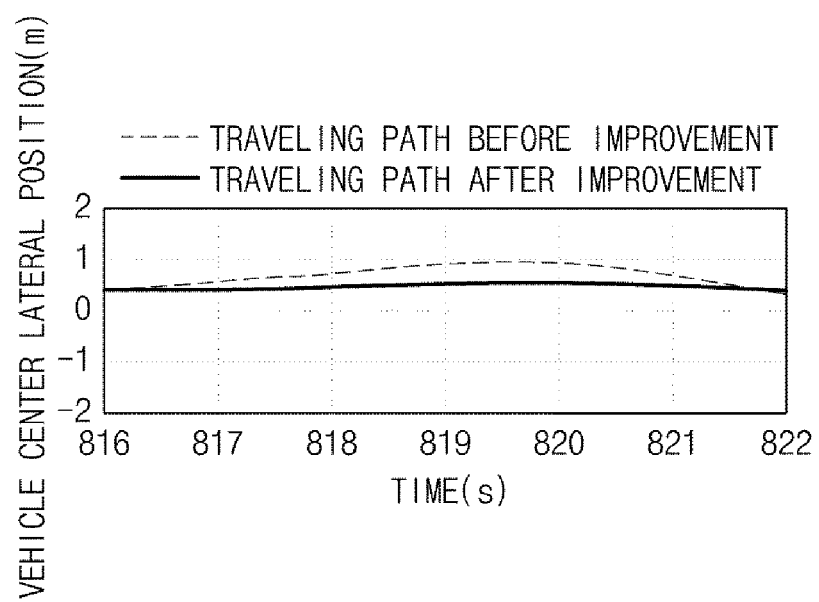
FIG. 8 is a graph illustrating the comparison between a conventional steering angle control path and a steering angle control path of the present invention.

FIG. 8 is a graph illustrating the comparison between a conventional steering angle control path and a steering angle control path of the present invention. It may be recognized from FIG. 8 that a steering angle is more stably represented along a traveling path after improvement rather than before improvement.

Following table 1 shows the maximum tracking error of the steering angle, the change in a vehicle center lateral position, and the offset of a tire from a lane center after and before improvement.

TABLE 1

| | Classification | | |
|---|---|---|---|
| | Before improvement | After improvement | Remarks |
| Maximum tracking Error of Steering Angle | 2.5 deg | 1.2 deg | 52% improved |
| Vehicle Center Lateral Position | 0.95 m | 0.52 m | 45% improved |
| Offset of Tire From Lane Center | 0.16 m | −0.18 m | |

The proportional gain for the steering angle control is varied depending on situations. Accordingly, when the tracking error represents the smaller value, the smaller gain may be applied, minimizing the sense of difference in steering. In addition, when the tracking error is increased, the larger gain is applied, allowing the robust control. As illustrated in table 1, when a real vehicle experiment is performed on a region having a lateral gradient, the experiment result shows that the movement degree of the lateral position of the vehicle is reduced from 0.95 m to 0.52 m, which provides a 45% improved effect.

As described above, according to an exemplary embodiment of the present invention, the steering angle is variably controlled such that the steering feeling of the driver is maintained while a robust control is possible against the vehicle variance and disturbance.

Figure 9:
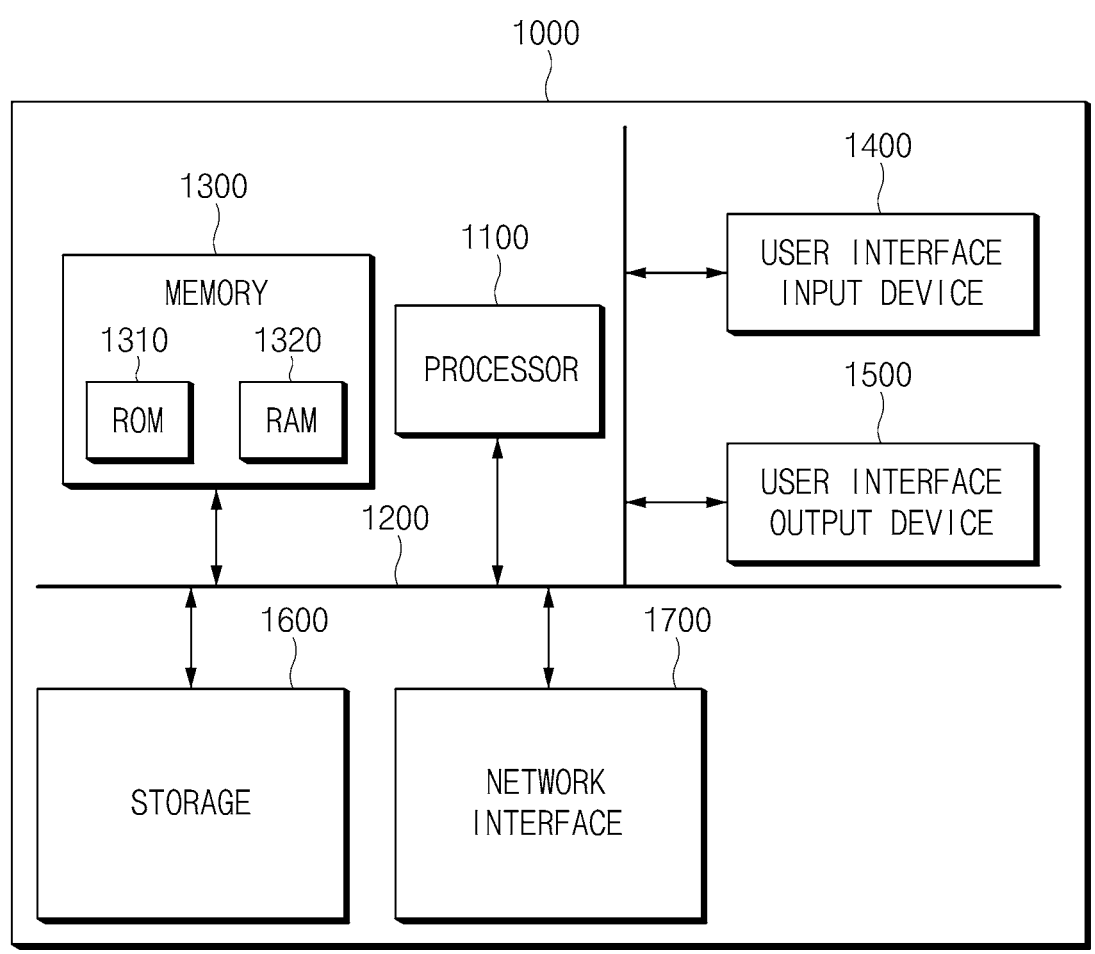
FIG. 9 is a block diagram illustrating the configuration of a computer system to which a method of controlling a steering angle is applied, according to an exemplary embodiment of the present invention.

FIG. 9 is a block diagram illustrating the configuration of a computer system to which a method of controlling a steering angle is applied, according to an exemplary embodiment of the present invention.

Referring to FIG. 9, a computing system 1000 may include at least one of a processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described with reference to the embodiments included in the present embodiment may be directly implemented with a hardware module, a software module, or combinations thereof, executed by the processor 1100 The software module may reside on a storage medium (i.e., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an exemplary embodiment of the present invention, when the steering angle error value represents the smaller gain, the smaller gain may be applied, minimizing the sense of difference felt by the driver in steering. In addition, when the steering angle error value is increased in vehicle variance and disturbance, the larger gain is applied, allowing the robust control.

In addition, according to an exemplary embodiment of the present invention, the gain increase rate may be reduced and the gain recovery rate may be restricted according to driver torque to enhance the stability of a system.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims. For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a steering angle, the apparatus comprising:
    a steering angle gain variation determination device configured to determine an increase or a decrease of a steering angle gain variation rate depending on a steering angle error value;
    a steering angle gain determination device configured to determine a steering angle gain based on the steering angle gain variation rate;
    a steering angle gain regulation device configured to determine a final gain in which a driver's intention is reflected in the steering angle gain; and
    a steering torque determination device configured to determine a steering torque by use of the final gain,
    wherein the steering angle gain variation determination device is configured to determine an increase variation rate by use of an initial gain, a maximum gain, and a time taken from the initial gain to the maximum gain.

2. The apparatus of claim 1, wherein the steering angle gain variation determination device includes:
    a variation rate determination device configured to determine the steering angle error value and to compare the steering angle error value with a predetermined threshold value to determine whether to increase or decrease the steering angle gain variation rate; and
    a maximum gain selection device configured to select the maximum gain when determination is made to increase the steering angle gain variation rate.

3. The apparatus of claim 2, wherein the steering angle gain variation determination device further includes:
    a decrease variation rate determination device configured to determine a decrease variation rate by use of the initial gain, the maximum gain, and a time taken from the maximum gain to the initial gain.

4. The apparatus of claim 3, wherein the steering angle gain variation determination device further includes:
    a variation rate setting device configured to determine whether the steering torque arrives at a maximum value and to set the steering angle gain variation rate to zero when the steering torque arrives at the maximum value.

5. The apparatus of claim 2, wherein the variation rate determination device determines the steering angle error value, determines to increase the steering angle gain variation rate when the steering angle error value is equal to or more than the predetermined threshold value, and determines to decrease the steering angle gain variation rate when the steering angle error value is less than the predetermined threshold value.

6. The apparatus of claim 5, wherein the variation rate determination device determines the steering angle error value by determining a difference between an actual steering angle and a required steering angle.

7. The apparatus of claim 1, wherein the steering angle gain regulation device includes:
    a first gain regulation ratio determination device configured to regulate downward the steering angle gain to determine a first gain regulation ratio, when the driver involves; and
    a second gain regulation ratio determination device configured to restrict the first gain regulation ratio from being recovered and to determine a second gain regulation ratio, after the driver involves.

8. The apparatus of claim 7, wherein the steering angle gain regulation device further includes a driver intention reflection device configured to determine the steering angle gain, in which the driver's intention is reflected, by applying the second gain regulation ratio to the steering angle gain.

9. The apparatus of claim 8, wherein the steering angle gain regulation device further includes:
    a final gain determination device configured to determine the final gain by adding up the steering angle gain, in which the driver's intention is reflected, and an initial gain.

10. The apparatus of claim 9, wherein the steering angle gain regulation device further includes:
    a driver-intention-reflected steering angle gain restriction device configured to set a maximum value and a minimum value of the steering angle gain in which the driver intention is reflected.

11. The apparatus of claim 1, wherein the steering torque determination device determines the steering torque by use of the final gain, the steering angle error value, a steering control differential gain, and a steering control integral gain.

12. A lane keeping assist system comprising:
    a steering angle detector configured to detect a steering angle of a vehicle to output an actual steering angle;
    a lane keeping location control device configured to determine and output a required steering angle for lane keeping by the vehicle;
    a torque detector configured to detect and output a torque value of the vehicle; and
    a steering angle control apparatus configured to regulate a steering angle gain depending on a steering angle error value which is a difference value between the actual steering angle and the required steering angle,
    wherein the steering angle control apparatus is configured to determine an increase variation rate by use of an initial gain, a maximum gain, and a time taken from the initial gain to the maximum gain.

13. The lane keeping assist system of claim 12, wherein the steering angle control apparatus decreases the steering angle gain when the steering angle error value is less than a predetermined threshold value, and increases the steering angle gain when the steering angle error value is equal to or more than the predetermined threshold value.

14. The lane keeping assist system of claim 13, wherein the steering angle control apparatus includes:
    a steering angle gain variation determination device configured to determine an increase or a decrease of a steering angle gain variation rate depending on the steering angle error value;
    a steering angle gain determination device configured to determine a steering angle gain based on the steering angle gain variation rate;
    a steering angle gain regulation device configured to determine a final gain in which a driver's intention is reflected in the steering angle gain; and
    a steering torque determination device configured to determine a steering torque by use of the final gain.

15. A method of controlling a steering angle, the method comprising:
- determining an increase or a decrease of a steering angle gain variation rate depending on a steering angle error value;
- determining a steering angle gain based on the steering angle gain variation rate;
- determining a final gain in which a driver's intention is reflected in the steering angle gain; and
- determining steering torque by use of the final gain,
- wherein the determining of the increase or the decrease of the steering angle gain variation rate includes determining an increase variation rate by use of an initial gain, a maximum gain, and a time taken from the initial gain to the maximum gain.

16. The method of claim 15, wherein the determining of the increase or the decrease of the steering angle gain variation rate includes:
- determining the steering angle error value and comparing the steering angle error value with a predetermined threshold value to determine whether to increase or decrease the steering angle gain variation rate;
- selecting the maximum gain when determination is made to increase the steering angle gain variation rate; and
- determining a decrease variation rate by use of the initial gain, the maximum gain, and a time taken from the maximum gain to the initial gain.

17. The method of claim 16, wherein the determining of the increase or the decrease of the steering angle gain variation rate further includes:
- determining whether the steering torque arrives at a maximum value; and
- setting the steering angle gain variation rate to zero when the steering torque arrives at the maximum value.

18. The method of claim 17, wherein the determining of the increase or the decrease of the steering angle gain variation rate further includes:
- determining the steering angle error value;
- determining to increase the steering angle gain variation rate when the steering angle error value is equal to or more than the predetermined threshold value; and
- determining to decrease the steering angle gain variation rate when the steering angle error value is less than the predetermined threshold value.

19. The method of claim 18, wherein the determining of the final gain includes:
- regulating downward the steering angle gain to determine a first gain regulation ratio, when the driver involves;
- restricting the first gain regulation ratio from being recovered to determine a second gain regulation ratio, after the driver involves;
- determining the steering angle gain, in which the driver intention is reflected, by applying the second gain regulation ratio to the steering angle gain; and
- determining the final gain by adding up the steering angle gain, in which the driver intention is reflected, and the initial gain.

20. The method of claim 19, wherein the determining of the steering torque includes determining the steering torque by use of the final gain, the steering angle error value, a steering control differential gain, and a steering control integral gain.

* * * * *